(12) United States Patent
Collins

(10) Patent No.: US 10,222,285 B2
(45) Date of Patent: Mar. 5, 2019

(54) PORTABLE GRAPHING VACUUM PRESSURE GAUGE

(71) Applicant: Timothy G. Collins, Union Beach, NJ (US)

(72) Inventor: Timothy G. Collins, Union Beach, NJ (US)

(*) Notice: Subject to any disclaimer, the term of this patent is extended or adjusted under 35 U.S.C. 154(b) by 0 days.

(21) Appl. No.: 15/196,198

(22) Filed: Jun. 29, 2016

(65) Prior Publication Data

US 2018/0266911 A1 Sep. 20, 2018

Related U.S. Application Data

(63) Continuation-in-part of application No. 14/923,390, filed on Oct. 26, 2015, now abandoned.

(60) Provisional application No. 62/122,563, filed on Oct. 24, 2014.

(51) Int. Cl.
*G01L 21/12* (2006.01)
*G01L 19/08* (2006.01)
*G01L 21/00* (2006.01)

(52) U.S. Cl.
CPC .......... *G01L 19/083* (2013.01); *G01L 19/086* (2013.01); *G01L 21/00* (2013.01)

(58) Field of Classification Search
None
See application file for complete search history.

(56) References Cited

U.S. PATENT DOCUMENTS

| | | | |
|---|---|---|---|
| 4,369,660 A * | 1/1983 | Lentz | G01R 13/02 73/114.37 |
| 4,579,002 A | 4/1986 | Zettler | |
| 5,136,885 A * | 8/1992 | Liebermann | G01L 9/0022 310/338 |
| 5,351,551 A | 10/1994 | Drubetsky | |
| 6,546,820 B1 * | 4/2003 | Van | G01N 3/60 73/865.8 |
| 6,727,709 B2 | 4/2004 | Jeong | |
| 2013/0282310 A1* | 10/2013 | Cardinale | G01L 27/005 702/53 |
| 2016/0116360 A1* | 4/2016 | Collins | G01L 21/12 73/755 |

* cited by examiner

*Primary Examiner* — Andre J Allen
(74) *Attorney, Agent, or Firm* — Mandelbaum Salsburg P.C.

(57) ABSTRACT

A portable vacuum pressure graphing gauge device enabling users of vacuum systems the ability to see trends of vacuum systems through real time plotting of a pressure vs. time curve on a hand held instrument, enabling them to understand what is going on in their system, or the like. A device may include several graphical modes designed to even more easily interpret vacuum data, and packaging that is rugged and versatile including a magnet, kickstand, wireless connectivity, visual and audible set points, automatic sensor fault detection, and several vacuum pressure measurement units to choose from, or the like.

20 Claims, 5 Drawing Sheets

PORTABLE GRAPHING VACUUM PRESSURE GAUGE

CROSS-REFERENCE TO RELATED APPLICATIONS

The present application claims priority to U.S. patent application Ser. No. 14/923,390 entitled "PORTABLE GRAPHING VACUUM PRESSURE GAUGE," filed Oct. 26, 2015, which claims priority to U.S. Provisional Patent Application Ser. No. 62/122,563 entitled "PORTABLE GRAPHING VACUUM PRESSURE GAUGE," filed Oct. 24, 2014, the disclosures of which are incorporated herein by reference in their entireties as if fully set forth herein.

BACKGROUND

Field of the Invention

Embodiments of the present invention are in the field of portable vacuum pressure measurement. More specifically, embodiments of the present disclosure may include a vacuum pressure gauge that generates graphics to assist a user in identifying and spotting trends or changes in vacuum, or the like. For example, embodiments of the present disclosure may comprise a gauge communicatively coupled with sensors for plotting real-time and historical data on a display, or the like.

Embodiments of the present invention may include a device for calculating and displaying trends or changes in vacuum via a hand held device or through communication to a mobile or computing device, or the like.

Description of Related Art

Instruments used to measure pressure are called pressure gauges or vacuum gauges. Vacuum gauges have many commercial, scientific, and industrial applications, such as laboratory, coating, metalizing, distillation, refrigeration, freeze dryers, assembly lines, vacuum ovens, and/or the like. One example of such a gauge is a micron gauge. A micron gauge measures the amount of air or noncondensables and moisture in a system in units of microns. The lower the micron reading, the deeper the vacuum and lower the amount of air and moisture in any given system. Most vacuum and pressure gauges display a current reading through an indicator needle against a scale, a digital numerical reading, voltage, or digital output. Typically, pressure and vacuum instrumentation may display a number indication representing a current reading, and in some instances an instantaneous relative reading relative to the total range of the instrument.

Some vacuum instrumentation may indicate increasing or decreasing pressure, indicated by an up arrow, down arrow or colors. Other solutions may display a leak rate. However, these solutions are limited, because, inter alia, users of vacuum instrumentation have no way of visualizing or accessing prior measurements or data using these instruments. None of these solutions include a time vs. pressure graph in a portable device, or even a device with internet/Ethernet connectivity capability.

Some solutions may include pressure set points that allow the user to be notified when a particular pressure level is reached, but do not use Ethernet, internet, or wireless communication capability. None of these instruments have the ability to display, log or transmit vacuum data wirelessly to a device such as a smart phone, tablet, or the like. In addition, none of these instruments generate and display trends in vacuum pressure. An instrument that would generate and display trends in vacuum pressure would be useful in allowing a user, such as a technician or engineer, to be able to more quickly identify problems and implement solutions.

As such, a need exists for a vacuum pressure gauge that may assist a user in identifying and spotting trends or changes in vacuum, or the like.

SUMMARY

Some embodiments of the present invention provide a portable vacuum gauge device that may comprise a sensor for collecting vacuum data; a processor for manipulating the vacuum data into display data and initiating transmission and reception of the vacuum data; a display adapted to display the graphical format, the display data comprising a graph of data collected in real-time; an input control unit for configuring settings of the device; a transmit and receive unit for wirelessly transmitting the vacuum data and the graphical format; and a power source for providing power to the device.

BRIEF DESCRIPTION OF THE DRAWINGS

So the manner in which the above-recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein.

Figure 1:
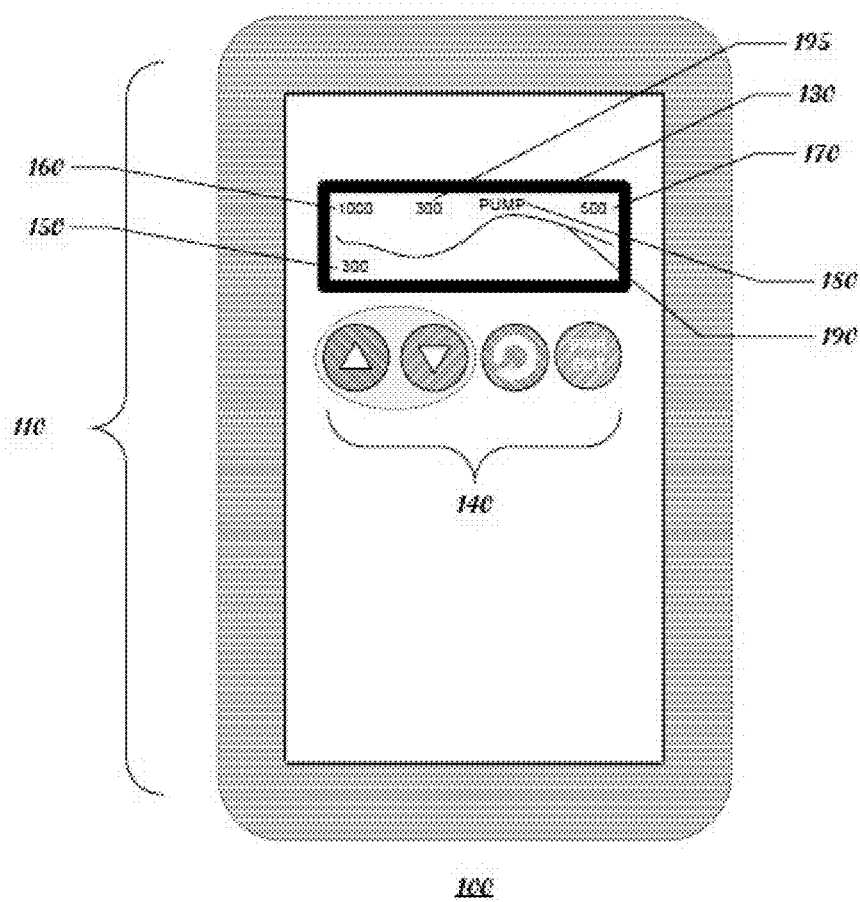
FIG. 1 is an illustration depicting a portable vacuum instrument with graphical display in accordance with embodiments of the present disclosure.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention are in the field of portable vacuum pressure measurement. More specifically, embodiments of the present disclosure may include a vacuum pressure gauge adapted to read and calculate measurements and generate graphics, such as a line graph of vacuum data collected over time, to assist a user in identifying and spotting trends or changes in vacuum, or the like. For example, embodiments of the present disclosure may comprise a gauge communicatively or operatively coupled with sensors for plotting real-time and/or historical data on a display, or the like. Detailed exemplary embodiments of the present invention are disclosed herein; however it is to be understood that the disclosed embodiments are merely exemplary of the invention which can be embodied in various forms.

Embodiments of the present invention would allow a user to see trends in vacuum data in easy to visualize graphical format and make appropriate repairs or adjustments based on these trends, in contrast with vacuum pressure gauges that simply provide a single measurement taken at a single point in time or in real-time. Embodiments of the present disclosure would improve the accuracy and effectiveness of repairs performed by technicians. In some embodiments, the portable vacuum pressure gauge may also provide the technician with a state of the vacuum, so that the technician knows what repairs or modifications need to be made.

In exemplary embodiments, a vacuum pressure measurement and display device may be provided. The device may increase the utility of instrumentation through a real-time display of current and past pressure points graphed in a time vs. pressure scale. In some embodiments, the device may be adjusted to display various time periods of vacuum data collected. For example, the settings of the device may be configured such that the device displays a time period of vacuum data collection over the last thirty minutes, forty-five minutes, one hour, two hours, five hours, eight hours, twelve hours, one day, two days, three days, five days, one week, two weeks, one month, three months, six months, and one year. The device may also be configured to display vacuum data in graphical format collected over a specified period of time. For example, the user may specify a specific period of time for example, between 12 PM and 1:15 PM, and the device may be designed and configured to display all data collected in that period of time in graphical format.

The device may include all the features of available micron gauges, plus the ability to trend data. In some embodiments vacuum measurement circuitry may read a sensor, display instantaneous pressure, and save the data in a database, and/or the like. The data may be plotted on a screen or display. An amount of data or types of data plotted on a screen or display may be defined or configured by a user. Additional analysis modules within the device may characterize trends of the data based on a user-specified time horizon, to make determinations on a vacuum system. These determinations may include vacuum states or trends such as: leaking, out-gassing, pumping, stable, real leak, internal leak, surface condition, virtual leaks, system materials, diffusion, permeation, back-streaming, and/or the like. Each of these determinations may be categorized as a vacuum state. In some embodiments, the One of the most common problems with vacuum systems is leaks. Another issue may be outgassing (sometimes called off-gassing, particularly when in reference to indoor air quality), which may comprise the release of a gas that was dissolved, trapped, frozen or absorbed in some material.

In some embodiments, the vacuum pressure gauge is designed and adapted to display this vacuum state, such as leaking, out-gassing, pumping, stable, or the like, as a result of the determination made by a processor in the gauge after performing calculations on the vacuum data collected by the gauge. Any suitable method of calculation of states of leaking, outgassing, pumping, stable, or the like, may be implemented by the processor of vacuum pressure gauges in accordance with embodiments of the present disclosure. Beyond these vacuum system determinations, the user may be able to see little "blips" of changes of pressure which may indicate other phenomena such as specific out-gassing events. In some embodiments of the present disclosure, the device may be adapted to communicate wirelessly with a mobile device, tablet, phone, or other device adapted to display data.

In accordance with exemplary embodiments, a portable device may be adapted to sense and/or measure pressure and/or vacuum through the use of a transducer, a passive gauge, or the like. Generally, a transducer is a device that converts one form of energy to another. In exemplary embodiments, a pressure transducer, or the like, may be used and may convert displacement into an electrical output such as voltage or current, or the like. For example a strain gage, a variable capacitance transducer, a piezoelectric transducer, and/or the like may be used. Embodiments of the present disclosure may include active gauges and/or passive gauges. Active vacuum gauges may combine a sensor itself, which may transform a mechanical magnitude pressure into an electrical magnitude, with a compact electronic control and evaluation unit, or the like. Active transducers may generate electric current or voltage directly in response to environmental stimulation. Passive transducers may produce a change in some passive electrical quantity, such as capacitance, resistance, or inductance, as a result of stimulation.

FIG. 1 is an illustration depicting a device 100, such as a portable vacuum instrument, with a housing 110, an integral thermocouple sensing element (not shown), a display 130, and/or controls 140 in accordance with embodiments of the present disclosure. Generally, vacuum is space void of matter. A portable device 100 in accordance with exemplary embodiments of the present disclosure may comprise components, electronics, and/or software to interpret a reading and generate a number that indicates vacuum. In some embodiments, the device 100 may comprise a Bluetooth transmitter/receiver and a display 130 made to display a graphing representation of values collected over time. The device 100 may comprise a graphing feature to assist the user in pinpointing problems in real-time or substantially in real-time. Some of these problems may include leak, pump, outgas, and/or stable related problems.

The device 100 may comprise wireless communication components to enable the device to communicatively or operatively couple with a mobile device, such as a smartphone, tablet computer, and/or the like. The device 100 may enable a user to wirelessly monitor, save and share vacuum and pump down data, or the like. The device 100 may enable the user to monitor data on the display 130 and/or remotely from the user's mobile device, or the like. In some embodiments, the system may be configured to allow a user to set alarms for certain values or threshold. For example, the user may configure the device 100 to generate an alarm upon measurement of a low value, a high value, a specific value, a range of values, and/or the like. The alarm may be a visual and/or audible alarm generated by the device 100, or may be a communication such as an SMS message or electronic communication transmitted wirelessly, for example, via Bluetooth to a mobile device, and or the like.

In some embodiments, the device 100 may be configured remotely via a mobile device via wireless connectivity and/or the like. For example, the device 100 may be configured such that a user may set a low and/or high alarm from a mobile phone via wireless communication such as Bluetooth, or the like. In some embodiments, the device 100 may be configured to communicate via electronic message, such as e-mail, or the like. For example, the device 100 may email vacuum data to document leaks, baseline pressure or pumpdowns to the user or a group of users, or the like. The device 100 may comprise a power source, for example, a battery, AC line, USB power, and/or the like. The battery may be rechargeable, for example, via AC, USB, microB-USB power, or the like.

In exemplary embodiments, a device 100 may comprise an electronics housing 110. An electronics housing 110 may comprise durable plastic, or the like, to protect all interior components from damage when dropped, impacted, or the like. The housing 110 may include an aperture for a graphical display 130. A graphical display 130 may comprise a viewable screen configured to digitally display data, graphs, and/or images and may be adapted to adjust visual settings such as brightness, contrast, and/or the like to enable a user to adjust the display so that it is sufficiently visible. In exemplary embodiments, the display 130 may use backlighting, or the like. By way of example, the graphical display 130 may comprise a liquid crystal display (LCD), or the like. In some embodiments, the graphical display 130 may comprise an electronic display, such as a light-emitting diode display (LED); an electroluminescent display (ELD); electronic paper, E Ink; a plasma display panel (PDP); a High-Performance Addressing display (HPA); a thin-film transistor display (TFT); an organic light-emitting diode display (OLED); a surface-conduction electron-emitter display (SED); a field emission display (FED); a laser TV; carbon nanotubes; a quantum dot display; an interferometric modulator display (IMOD); and/or the like. The display may be adapted to display in color, black in white, 2D, 3D, and/or the like. Generally, the graphical display 130 may comprise a display suitable for displaying data and/or graphs in accordance with embodiments of the present disclosure. For example, the graphical display 130 may be designed and configured to display a graph of vacuum pressure data collected over time in a line graph format, or other graphical format, thereby displaying trends in vacuum data to the user in a visually pleasing manner.

In some embodiments, a device 100 may comprise thermocouple sensing technology, and/or the like. A thermocouple may comprise an electrical device comprising at least two different conductors forming electrical junctions at differing temperatures, or the like. In exemplary embodiments, the sensing technology may be connected or otherwise communicatively or operatively coupled to a display 130 through a wire, circuitry, or the like. Some embodiments may include thermistor, Pirani, convection, piezoresistive, or other vacuum-sensing technologies, or the like. In some embodiments, the thermocouple sensing technology may comprise a Hastings DV-4D Thermocouple Vacuum Gauge Tube, a Hastings DV-6M Thermocouple Gauge Tube, a Hastings DV-6R Thermocouple Gauge Tube, an Agilent/Varian 536 Thermocouple Tube, an Agilent/Varian 536 Thermocouple gauge, an Agilent/Varian 531 Thermocouple Gauge, a hybrid Thermocouple and Piezoresistive vacuum sensor, a Frederics 2A thermocouple tube, and/or the like. As used herein, the term "sensor" may also refer to a "thermocouple" or a "thermocouple vacuum gauge tube," that is known in the art, or the like.

In some embodiments a sensor, electronics, and display 130 may share the same housing 110, or the like. Some components of the device 100 may be housed in a housing 110, which may comprise a case with a rubber protective boot, or the like. In some embodiments, the housing 110 may comprise apertures or openings for controls 140, such as buttons, a button assembly, or other suitable controls for controlling various features of the device. Although in FIG. 1, four buttons are depicted, any suitable number of buttons for controlling a device in accordance with the present disclosure is contemplated. The controls 140 may comprise navigational buttons, such as an "up" button, a "down" button, for navigating certain menus and configuring various settings of the device 100. In some embodiments the controls 140 may include a "refresh" or "reload" button for refreshing the data or activating the device 100 to collect a measurement. In some embodiments, the controls 140 may comprise a "power" button for turning the device 100 on and off. In some embodiments, the controls 140 may comprise an "enter" button for selecting various options or accepting various configurations of the device 140.

A device 100 in accordance with the present disclosure may comprise a coherent display 130 displaying a real time graphing display element 190, with various other readings or measurements 150, 160, 170, 195, that may assist a user. In some embodiments, the device 100 may be adapted to display, via the display 130, or the like, graphing features including a zoom graphing feature element 190, a pumpdown graph that may be a continuous bar graph, an instantaneous bar graph, numerical values (See FIG. 2), and/or the like. In exemplary embodiments, a current vacuum reading 170 may be collected, measured, and displayed.

In some embodiments, the device 100 may be adapted to displays a zoom graphing feature 190 where the pressure (vertical Y) axis will be automatically scaled by using the lowest number 150 in the time window as the lowest pressure value, and the highest number 160 in the time window as the highest pressure value on the (vertical) Y axis. The rate of change of vacuum is displayed 195 and calculated by averaging a recent portion of the latest vacuum data within the time window selected. The device 100 may comprise a processor to calculate these values. Some embodiments may comprise different bounds for the Y axis pressure variables, or the like. The interpretation of the rate of vacuum change and curve shape may determine a system state 180 determination. Examples of some states are pumping, leaking, outgassing and stable, which describe the trend of vacuum pressure data in the time interval of interest. Pumping means that the system measurement is decreasing in pressure over the time interval of interest; Leaking means the system is increasing in pressure over the time interval of interest; Outgassing means that the system pressure initially increases, then becomes stable over the time interval of interest; and stable means that there is no appreciable change in pressure during the time interval of interest.

Embodiments of the present disclosure may include additional or other system state analysis determinations. A user may select different units, for example, they may select between 12 different units, or the like. These 12 units are microns, millitorr, Torr, mbar, Bar, kPa, Pa, PSIA, mmHg, inHg, mmH20 and inH20. Typically certain industries have a preference of measurement units. Just like in the U.S. we use miles per hour instead of km/h, similarly we use Torr in the U.S. in the academic world instead of mmH20 for the medium vacuum range. In some embodiments, pressure measurement unit choices may be preconfigured and less or more than 12 units. The device 100 may be configured to allow a user to configure and/or select one or more discrete time windows including 1 minute, 10 minutes, 30 minutes, 1 hour and 24 hours, any suitable time consistent with the present disclosure, or the like.

Figure 2:
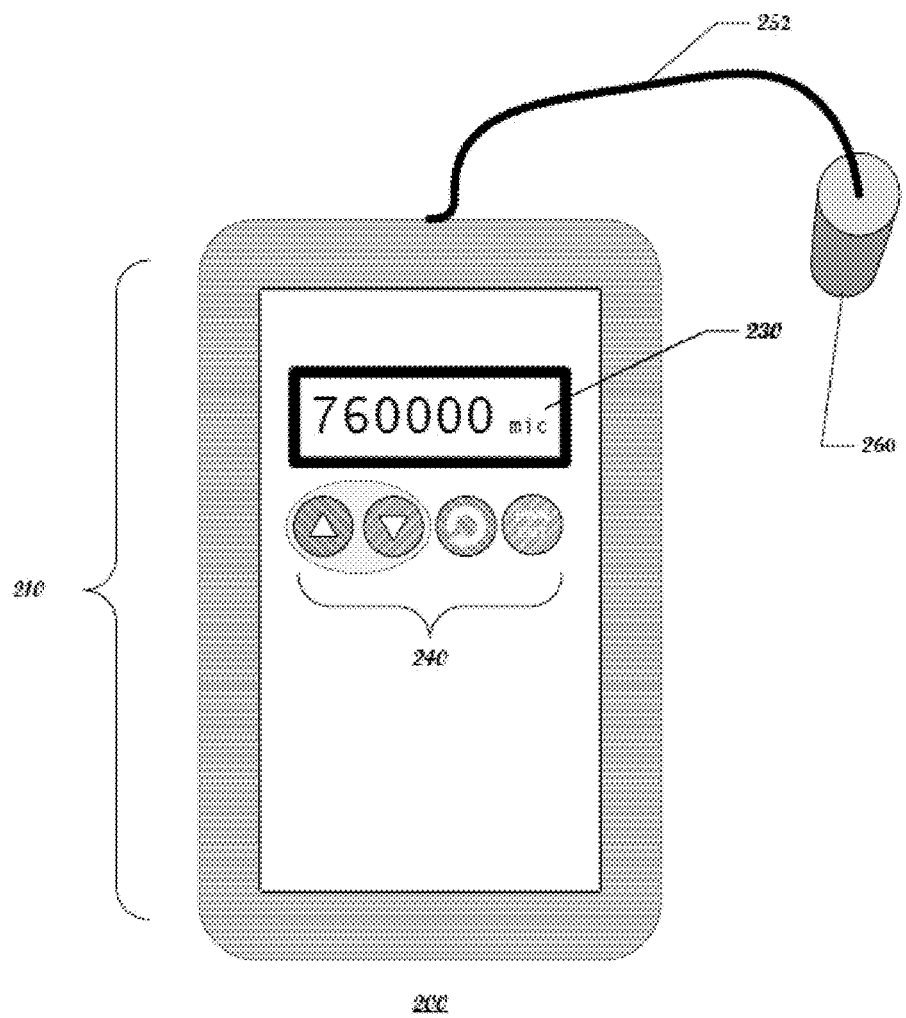
FIG. 2 an illustration depicting a portable vacuum instrument with a vacuum sensor in accordance with embodiments of the present disclosure.

In exemplary embodiments, the housing 100 may have a rectangular shape, or any suitable shape for allowing a user to hold the housing 110 comfortably. For example, the housing 110 may comprise a triangle, square, circle, oval, or ergonomic shape having depressions to conform to a user's hand, or the like. In some embodiments, the housing 110 may comprise a magnet, hook and loop connections, a pin, a clip, or other connection member for allowing the housing 110 to be connected or removably attached to another surface. In some embodiments, the housing 110 may comprise a stand, such as a hinged stand, or the like, that may be adapted to allow the housing 110 to be supported in a position for ease of viewing for the user. For example the stand may support the housing in at a 10-90 degree angle from a surface supporting a portion of the housing 110, or the like. FIG. 1 is diagram of a device 100 with the sensor either internal to the device or not present. FIG. 2 shows a device 200 with a sensor 260 and a wire 252 communicatively and/or operatively coupled externally to a device 200 and configured to collect readings in accordance with embodiments of the present disclosure.

FIG. 2 an illustration depicting a portable vacuum instrument device 200 with a vacuum sensor 260 in accordance with embodiments of the present disclosure. In accordance with exemplary embodiments, a device 200 may comprise a housing 210, a display 230, controls 240, thermocouple measuring tubes or a sensor 260, a wire 252, and/or the like. The housing 210, display 230, controls 240, sensor 260 are identical to the corresponding housing 110, display 130, controls 140, and sensors described with respect to FIG. 1. Thermocouple measuring tubes or sensors 260 may measure pressure in a partial vacuum. A change in pressure in the measuring tube may change a molecular collision rate and therefore the thermal conduction of the gas or gas mixture surrounding the thermocouple. Such measuring tubes may be operated using various operating methods.

In exemplary embodiments, in operation, an alternating voltage may be continuously applied to the thermocouple or sensor 260, thereby heating the thermocouple or sensor 260. The resulting temperature shift may depend on the pressure of the surrounding gas or gas mixture and may cause a change in the thermocouple or sensor's DC output inversely with pressure changes. This operating method may be used within a relatively small pressure measurement range, or the like. In some embodiments, the thermocouple or sensor's 260 temperature may be electronically controlled to maintain a predetermined temperature by continuously adjusting the electrical power applied to the thermocouple or sensor 260. The amount of power applied to the thermocouple or sensor 260 may be evaluated and used as a measure for the pressure of the partial vacuum, or the like. This operating method may extend the measurement range of pressures in a vacuum.

U.S. Pat. No. 4,579,002, hereby incorporated by reference in its entirety as if fully set forth herein, describes an operating method, in which a pulsed heating current is supplied to the thermocouple. In the "off" periods of the heating pulse the generated thermoelectric voltage (EMF) is measured using an amplifier. A comparator compares the measured, amplified thermoelectric voltage to a set-point value. If the amplified EMF deviates from the set-point value, the length of the heating pulse is adjusted to move the amplified EMF towards the set-point value. This maintains a constant temperature at the thermocouple while operated.

A method is described in U.S. Pat. No. 5,351,551, in which the constant temperature at the thermocouple is maintained by controlling the current of the heating pulse. U.S. Pat. No. 5,351,551 hereby incorporated by reference thereto in its entirety as if fully set forth herein. U.S. Pat. No. 6,727,709, hereby incorporated by reference in its entirety as if fully set forth herein, describes a thermal conduction vacuum gauge using a Peltier tip. A Peltier tip may be part of a measuring bridge in a vacuum chamber. The measuring bridge may be operated at constant power or at constant temperature. A voltage signal obtained from the measuring bridge may be a measure of the pressure. These methods are included for exemplary purposes. Any method suitable for use with embodiments of the present disclosure is contemplated.

Figure 3:
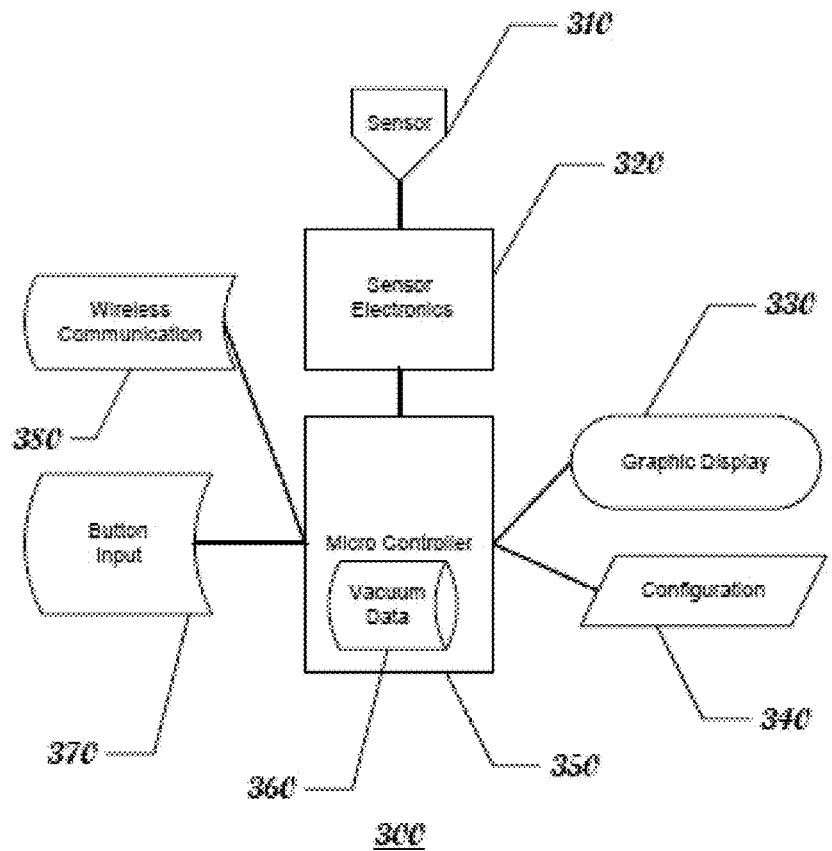
FIG. 3 is a block diagram illustrating relationships between components in accordance with embodiments of the present disclosure.

FIG. 3 is a block diagram illustrating relationships between components of a device 300 in accordance with embodiments of the present disclosure. The device 300 is identical to those described herein with respect to FIG. 1 and FIG. 2. In exemplary embodiments, different functional units, each of which may comprise a variety of components with various functions. A sensor 310 may comprise a thermocouple, for example a passive thermocouple vacuum gauge sensor. In some embodiments, the device 300 may comprise sensor electronics 320. Sensor electronics 320 may comprise constant temperature regulating electronics combined with cycling electronics, which are piped into a micro-controller 350 for further processing. The resultant measurement may be converted to the appropriate measurement units and is transmitted to a graphic display 330 and stored in a database 360 of vacuum data, or the like. A user may select to alarm at a particular vacuum level, time durations, units, auto off timing and several other features through one or more button inputs 370. In some embodiments, configuration settings may be stored in persistent storage via a configuration memory 340. If so equipped, the user may transfer the data real-time or substantially real-time to a device, such as a tablet, cell phone or other personal device via a wireless communication circuitry 380, which may be configured to transmit data wirelessly using available wireless communication protocols.

In accordance with exemplary embodiments, the sensor 310 may provide the signal change with pressure. The sensor 310 may comprise a passive sensor with no active electronics or alternatively, may be an active sensor that includes a passive sensor and on board electronics, or the like. The sensor electronics may comprise a drive field-effect transistor (FET), amplifier and other suitable components adapted or configured to modulate a current based on the current pressure. Wireless communication may be achieved by a Bluetooth or wireless network (Wi-Fi) chip or transmitter communicating with a microcontroller, or the like. The controls 140 may comprise one or more button inputs, which may comprise micro-switches, or the like, that may be soldered on a circuit board, or any suitable method for connecting the button inputs to a circuit board, or like. The gauge may also comprise configurations 340 or a configuration module. Configurations 340 may comprise software settings to customize how the gauge displays information to the users. Lastly, the graphic display 330 may comprise an LCD screen, or the like, that communicates with microcontroller via data lines, or the like, and displays the number, graph or other representation based on the settings. In exemplary embodiments, vacuum data i may be archived in RAM within the microcontroller, or the like. In some embodiments, the vacuum data may reside or be stored in a separate data chip or Secure Digital (SD) card, a memory card, a flash card, an electronic flash memory data storage device, another data storage device, a data storage medium, or the like.

Figure 4:
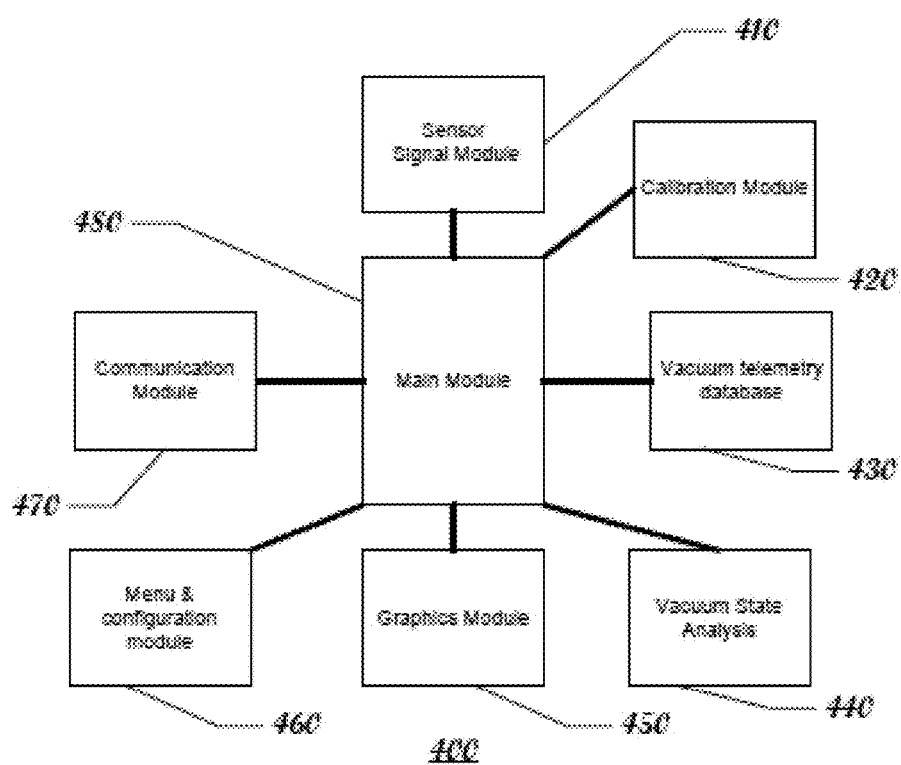
FIG. 4 is a block diagram illustrating software architecture residing within a micro-controller in accordance with embodiments of the present disclosure.

FIG. 4 is a block diagram illustrating software architecture residing within a micro-controller in accordance with embodiments of the present disclosure. In some embodiments, a software architecture 400 may comprise a main module 480 that calls other modules, or polls data of other modules based on interrupts, or the like. A sensor module 410 may receive a hardware message or signal, perform additional post processing, and deliver a value to the main module. The post process involves comparing the current signal and pressure range to an ideal curve and lookup table in order to determine the current pressure reading, or the like. A calibration module 420 may be called when a vacuum sensor needs to be calibrated, or the like. The device may be calibrated by comparing the device output to a calibration standard, then adjusting the VAC, MID and ATM variables so that the gauge reads at peak accuracy. Once the data is ready to be displayed, a main module may send the data to the graphics module 450 and the vacuum telemetry database 430. In some embodiments, the vacuum state analysis module 440 is constantly working and when sufficient data based on the selected time window exists, an analysis is presented to the main module for display. This analysis may be continuously recalculated based on the latest data. When the user wishes to change a configuration setting, the menu and configuration module 460 may be called. The communication module 470 may be used to transmit data from the gauge wirelessly to the outside world. In exemplary embodiments, the Sensor Signal Module 410 may monitor the relationship between the current pressure reading and the low level output, and modulate the current for optimal response. In some embodiments, the calibration module may take the current pressure indication and factor in the calibration variables in order to normalize the sensor and electronics for optimal accuracy.

In exemplary embodiments, the Vacuum telemetry database may keep an in-memory copy of the current data set for processing graphics and vacuum state analysis. The Vacuum State Analysis may be constantly calculating the current vacuum state based on the shape of the data in the most recent ⅓ of the data window, or the like. The graphics module may display text and graphics based on the system state, current vacuum data and historical vacuum data. The Menu and configuration module may handle the interaction with the user through a menu of button sequences in order to set user preferences. Lastly, the communication module may take the current vacuum data and interfaces with the wireless chip to send that data. The Main Module may make decisions on which modules to call based on the current state of the system.

Figure 5:
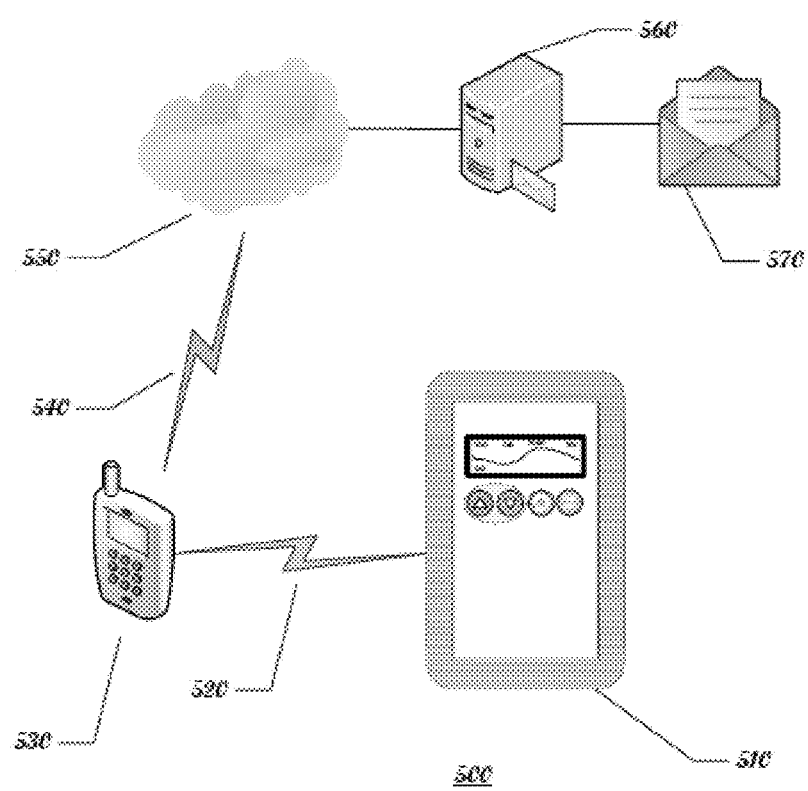
FIG. 5 is a diagram illustrating a communication path of transmission of vacuum data to a user's personal device, or the like, and then wirelessly to their email through the internet, or the like, in accordance with exemplary embodiments of the present disclosure.

FIG. 5 is a diagram illustrating a system 500 and a communication path of transmission of vacuum data to a user's personal device, wirelessly to email through the internet, or the like, in accordance with exemplary embodiments of the present disclosure. FIG. 5 shows an example of delivering vacuum data to the outside world. A device 510 (identical to the devices 100, 200 depicted and described above) may transmit wirelessly 520 to a mobile device, such as a smart phone 530, tablet or other commercially available personal device, or the like. A personal device may run an application or "App" to collect and display a current vacuum reading. The App may collect and transmit the data wirelessly 540 or via a wired connection, or the like, to another destination such as a computer 560 a server, or the like, via email 570, or the like or other data transfer mechanism that may occur through "the cloud" 550, the internet, and/or the like.

It will be understood that exemplary embodiments of the present invention set forth herein may be operated in a sequence different from a sequence illustrated or described herein. Likewise, in the case in which it is described herein that a method includes a series of steps, a sequence of these steps suggested herein is not necessarily a sequence in which these steps may be executed. That is, any described step may be omitted and/or any other step that is not described herein may be added to the method.

A term "connected" used herein is defined as being directly or indirectly connected in an electrical or non-electrical scheme. Here, objects described as being "adjacent to" each other may physically contact each other, be close to each other, or be in the same general range or region, in a context in which the above phrase is used. Here, a phrase "in an exemplary embodiment" means the same exemplary embodiment, but is not necessarily limited thereto. In addition, in the disclosure and the claims, terms such as "connected", "connecting", "linked", "linking", "coupled", "coupling", and the like, and various modifications of these terms may be used as the meaning including that one component is directly connected to another component or is indirectly connected to another component through the other component.

In addition, terms used in the present disclosure are for explaining exemplary embodiments rather than limiting the present invention. In the present disclosure, a singular form includes a plural form unless explicitly described to the contrary. Components, steps, operations, and/or elements mentioned by terms "comprise" and/or "comprising" used in the disclosure do not exclude the existence or addition of one or more other components, steps, operations, and/or elements.

Hereinabove, the present invention has been described with reference to exemplary embodiments thereof. All exemplary embodiments and conditional illustrations disclosed in the present disclosure have been described to intend to assist in the understanding of the principle and the concept of the present invention by those skilled in the art to which the present invention pertains. Therefore, it will be understood by those skilled in the art to which the present invention pertains that the present invention may be implemented in modified forms without departing from the spirit and scope of the present invention. Therefore, exemplary embodiments disclosed herein should be considered in an illustrative aspect rather than a restrictive aspect. The scope of the present invention should be defined by the claims rather than the above-mentioned description, and equivalents to the claims should be interpreted to fall within the present invention.

While the foregoing is directed to embodiments of the present invention, other and further embodiments of the invention may be devised without departing from the basic scope thereof. It is also understood that various embodiments described herein may be utilized in combination with any other embodiment described, without departing from the scope contained herein. In addition, embodiments of the present invention are further scalable to allow for additional components, as particular applications may require.

What is claimed is:

1. A portable vacuum gauge device comprising:
    a sensor for collecting vacuum pressure data;
    a processor for manipulating the vacuum pressure data into a graphical format;

a display comprising a single screen adapted to display the graphical format, the graphical format comprising a graph of vacuum pressure data points collected over time;

an input control unit for configuring settings of the device; and a power source for providing power to the device.

2. The device of claim 1, wherein the vacuum pressure data is displayed in real-time.

3. The device of claim 1, further comprising:

a wireless transmitter and receiver configured to transmit and receive wirelessly via the Bluetooth protocol to a personal device.

4. The device of claim 3, wherein the personal device is a tablet computer or smartphone.

5. The device of claim 1, wherein the power source is a battery.

6. The device of claim 1, wherein the vacuum pressure data comprises at least one of a lowest pressure over a predetermined time, a highest pressure over a predetermined time, a current vacuum reading.

7. The device of claim 1, wherein the display data further comprises at least one of a system status and a rate of change in vacuum pressure.

8. The device of claim 1, wherein the gauge also indicates a vacuum state based on the vacuum pressure data, the state describing the trend of vacuum pressure data in the time interval of interest.

9. The device of claim 8, wherein the vacuum states comprise leaking, out-gassing, pumping, and stable.

10. The device of claim 1, wherein the settings of the device comprise a time period of vacuum data collection to be displayed in the graphical format.

11. The device of claim 10, wherein the time period of vacuum data collection is at least one of thirty minutes, forty-five minutes, one hour, two hours, five hours, eight hours, twelve hours, one day, two days, three days, five days, one week, two weeks, one month, three months, six months, and one year.

12. The device of claim 10, wherein the time period of vacuum data collection is a specific time period selected by a user.

13. A portable vacuum gauge device comprising:

a vacuum pressure sensor having an output that produces vacuum pressure data;

a processor for receiving and manipulating the vacuum pressure data into a graphical format;

a display comprising a single screen adapted to display the graphical format, the graphical format comprising a graph of vacuum pressure data points collected over time;

an input control unit for configuring settings of the device; and a power source for providing power to the device.

14. The device of claim 13, further comprising:

a wireless transmitter and receiver configured to transmit and receive wirelessly via the Bluetooth protocol to a personal device, wherein the vacuum pressure data is displayed in real-time.

15. The device of claim 14, wherein the personal device is a tablet computer or smartphone and the power source is a battery.

16. The device of claim 13, wherein the vacuum pressure data comprises at least one of a lowest pressure over a predetermined time, a highest pressure over a predetermined time, a current vacuum reading.

17. The device of claim 13, wherein the display data further comprises at least one of a system status, a rate of change in vacuum pressure, and the trend of vacuum pressure data in a time interval of interest.

18. The device of claim 17, wherein the vacuum states comprise leaking, out-gassing, pumping, and stable.

19. The device of claim 13, wherein the settings of the device comprise a time period of vacuum data collection to be displayed in the graphical format, wherein the time period of vacuum data collection is at least one of thirty minutes, forty-five minutes, one hour, two hours, five hours, eight hours, twelve hours, one day, two days, three days, five days, one week, two weeks, one month, three months, six months, and one year.

20. The device of claim 19, wherein the time period of vacuum data collection is a specific time period selected by a user.

* * * * *